UNITED STATES PATENT OFFICE.

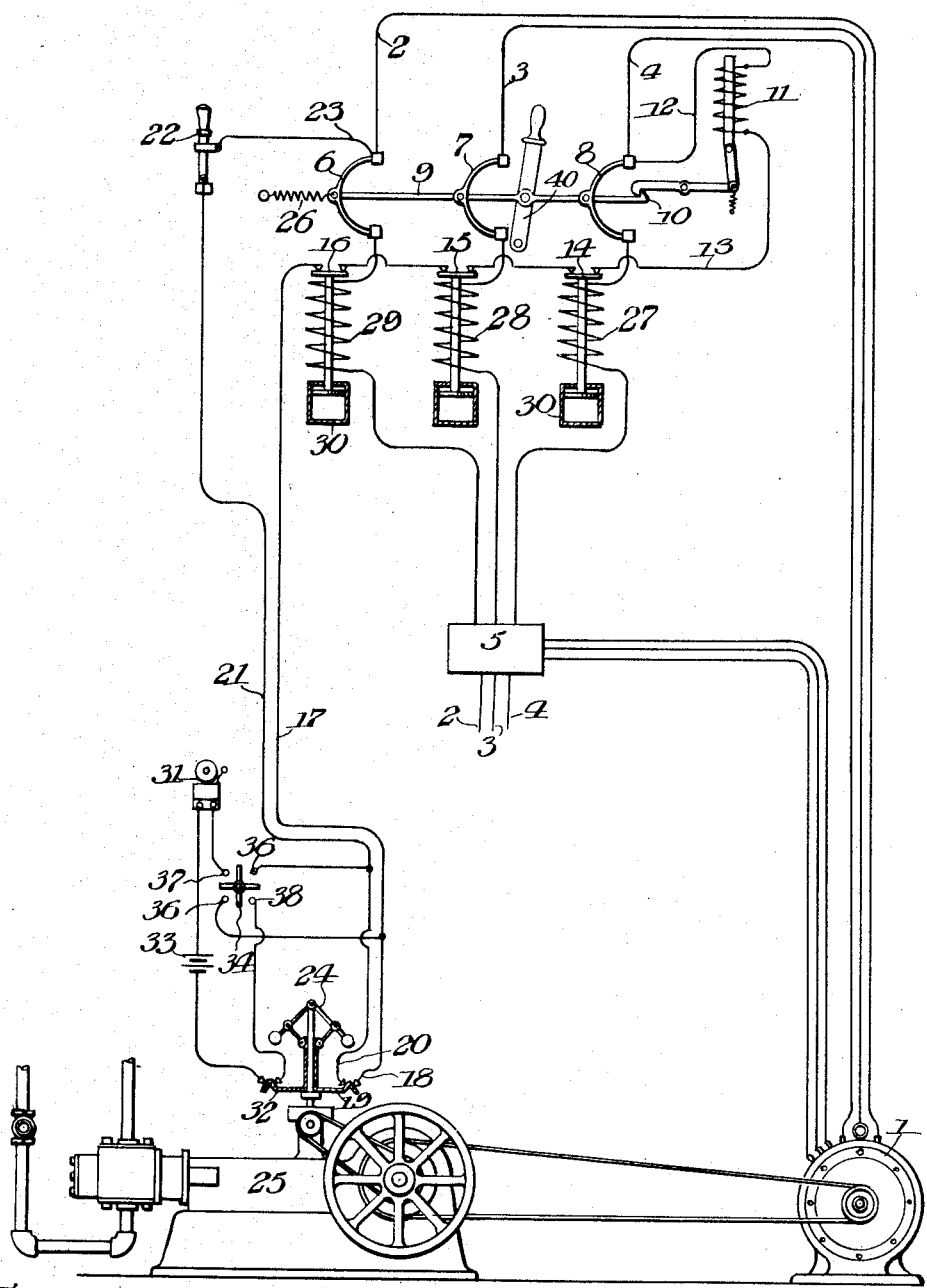

NELS JOLEEN, OF CHICAGO, ILLINOIS.

ELECTRIC CONTROL SYSTEM.

1,205,451. Specification of Letters Patent. Patented Nov. 21, 1916.

Original application filed April 10, 1914, Serial No. 830,911. Divided and this application filed March 13, 1915. Serial No. 14,198.

*To all whom it may concern:*

Be it known that I, NELS JOLEEN, a citizen of the United States, residing at Chicago, in the county of Cook and State of Illinois, have invented a certain new and useful Improvement in Electric Control Systems, of which the following is a full, clear, concise, and exact description, reference being had to the accompanying drawings, forming a part of this specification.

My invention relates to electric control systems and is more particularly adapted for the control of refrigerating systems.

My invention however has various uses, it merely being described herein as of particular utility in connection with the automatic control and protection of machinery used in connection with refrigeration plants.

In a specific instance I may point out that where induction motors are used to drive refrigerating pumps, that these motors very frequently run to their full capacity or even to a fifty per cent. overload, and slight fluctuations in the pressure of the three phase circuit cause these motors to slow down to a point where they will not pick up again after the pressure becomes normal. It is readily apparent that if the motor is runing at or over its capacity, that a momentary fluctuation in the supply current will cause the motor to choke, whereby the speed will drop. Upon a resumption of the normal pressure fuses may be blown or other damage done which should be avoided.

In accordance with my invention I provide a circuit breaking device responsive to a no-current or other predetermined condition in either phase so arranged as to open the motor circuit upon a predetermined change in the current conditions of any phase. Simultaneously with the operation of the circuit breaking device aforesaid my invention further contemplates the provision of means whereby a decrease in the speed of the motor likewise actuates the circuit controlling device or devices, this decrease in speed of the motor usually being due to conditions which should be rectified, it being inadvisable to continue the operation on such reduced speed.

My invention herein is a divisional application of my prior application Serial No. 830,911, filed April 10, 1914.

I will explain one form which my invention may take more in detail by referring to the accompanying drawing illustrating diagrammatically a system constructed and arranged in accordance with my invention.

My invention contemplates the operation for instance of a slip ring type motor 1 from a suitable source of three phase power here indicated by the conductors 2, 3 and 4. These conductors 2, 3 and 4 from the source then pass through any suitable kind of hand starter 5. I provide three switch elements 6, 7 and 8 adapted each to coöperate respectively with two associated contacts and to complete the circuit across these contacts. The switch elements 6, 7 and 8 however operate conjointly by being united to a bar 9 held in position by a suitable latch 10. The latch 10 is controlled by the circuit breaking electromagnet 11. The circuit breaking electromagnet has its circuit completed from the main 4 by way of the conductor 12, magnet 11, conductor 13, and the three sets of contacts 14, 15 and 16. These three sets of contacts 14, 15 and 16 are serially included in the conductor 13. The electromagnetic control circuit then extends by way of conductor 17 to a switch contact 18, switch arm 19, switch contact 20, conductor 21, emergency switch 22, conductor 23 to the main 2. The switch spring 19 is controlled by the governor 24 of the compressor 25. Now it will thus be seen that the circuit at the elements 18, 19 and 20 is controlled by the speed of the compressor and hence the speed of the motor. It will also be seen that circuit through the electromagnet 11 must be closed at all of the points 14, 15, 16, 19 and 22 in order to be in condition to hold the switch elements 6, 7 and 8 closed. A spring 26 normally tends to retract the bar 9 as is readily apparent. The switch springs 14, 15 and 16 are respectively controlled by series coils 27, 28 and 29 serially included respectively with the conductors 4, 3 and 2. Dash pots 30 control the movement of the plungers of these series coils 27, 28 and 29. Thus whenever the speed of the motor drops the contact at 19 is open, thereby depriving the coil 11 of current and causing an opening of the circuit. Likewise should the current in any one phase fail, then the particular series coil 27 for instance releases its plunger thereby opening the contact at 14, and likewise depriving the coil 11 of current, in which case the circuit is again opened. This is absolutely necessary because should the current in one conductor fail, the motor might be operating as a single conductor motor and burn out or should the current in one phase fail whereupon the motor stops, then the restoration of that phase of the circuit controlling devices which are still intact would cause a burning out of the motor as it cannot start under load.

I provide an alarm 31 which is of particular benefit to indicate when the speed of the motor has reached its required amount. The reason for this resides in the fact that the governor 24 of course cannot permit closure of the contact at 19 until after the motor has reached its rotating speed. During the time that the motor is coming up to speed however the contact at 19 must be held closed by hand. For this reason I provide a coöperating contact 32 which normally closes the alarm circuit, this alarm circuit having a battery 33 as indicated. I provide a double contact switch 34 which in the drawing is shown in its open position. Now should it be desired to start the system, then this switch 34 is turned clockwise forty-five degrees so that it connects contacts 35 and 36 together and also connects contacts 37 and 38 together. Connecting contacts 35 and 36 together amounts to the same thing as holding the switch element 19 in its closed position, thus avoiding manual operation of the element 19. Now turning of the switch 34 into the position indicated also makes a tentative circuit for the alarm 31 which will not be completed until the governor comes up to speed, thereby controlling the contacts controlled by the arm 32. Thus as soon as the motor is up to speed the alarm circuit is completed, whereupon the switch 34 may be turned back to the position shown, as at that time the corresponding circuit at 19 is closed and the circuit across the elements 35 and 36 may be opened. The emergency switch of course can be used at any time should it be desired to throw out the circuit breaker consisting of the elements 6, 7 and 8 should this be found desirable. A handle 40 is shown which may be used to close the circuit breaker.

From what has been described the nature of my invention will be readily clear to those skilled in the art.

Having however thus described one form which my invention may take, what I claim as new and desire to secure by Letters Patent is:

1. In a system of the character described the combination with a motor, a machine driven by said motor, a three phase circuit for supplying current to said motor, and means controlled by the speed of the motor and the current conditions in any conductor of said three phase circuit to control the association of said motor with said three phase circuit.

2. In a system of the character described the combination with a motor, a pump driven by said motor, a three phase circuit for supplying current to said motor, a main line switch for all phases to control the connection of said motor with said circuit, and means controlled by the speed of the motor and the current conditions in any conductor of said three phase circuit to control said main line switch.

3. In a system of the character described the combination with a motor, a machine driven by said motor, a three phase circuit for supplying current to said motor, and a governor responsive to the speed of the motor to control the association of said motor and the current conditions in any conductor of said three phase circuit with said three phase circuit.

4. In a system of the character described the combination with a motor, a pump driven by said motor, a three phase circuit for supplying current to said motor, a main line switch for all phases to control the connection of said motor with said circuit, means responsive to current conditions in either conductor of said three phase circuit to control said main line switch, and a governor responsive to the speed of the motor to control said main line switch.

5. In a system of the character described the combination with a motor, a machine driven by said motor, a three phase circuit for supplying current to said motor, means responsive to current conditions in either conductor of said three phase circuit to control the association of said motor with said three phase circuit, a governor responsive to the speed of the motor to control the association of said motor with said three phase circuit, and an alarm circuit controlled by said governor.

6. In a system of the character described the combination with a motor, a pump driven by said motor, a three phase circuit for supplying current to said motor, a main line switch for all phases to control the connection of said motor with said circuit, means responsive to current conditions of any conductor of said three phase circuit to control said main line switch, a governor responsive to the speed of the motor to control said main line switch, and an alarm circuit controlled by said governor.

7. In a system of the character described the combination with a motor, a machine driven by said motor, a three phase circuit for supplying current to said motor, means responsive to the current conditions of any conductor of said three phase circuit to control the association of said motor with said three phase circuit, a governor responsive to the speed of the motor to control the association of said motor with said three phase circuit, an alarm circuit controlled by said governor, and a switching device to control said alarm circuit.

8. In a system of the character described the combination with a motor, a pump driven by said motor, a three phase circuit for supplying current to said motor, a main line switch for all phases to control the connection of said motor with said circuit, means responsive to current conditions of any conductor of said three phase circuit to control said main line switch, a governor responsive to the speed of the motor to control said main line switch, an alarm circuit controlled by said governor, and a switching device to control said alarm circuit.

9. A system of the character described the combination with a motor, a pump driven by said motor, a three phase circuit for supplying current to said motor, a main line switch for all phases to control the association of said three phase circuit with said motor, a tripping circuit for said main line switch, means responsive to the current conditions of any conductor of said three phase circuit to control said tripping circuit, and a governor controlled by the speed of the motor to control said tripping circuit.

10. A system of the character described the combination with a motor, a pump driven by said motor, a three phase circuit for supplying current to said motor, a main line switch for all phases to control the association of said three phase circuit with said motor, a tripping circuit for said main line switch, a governor controlled by the speed of the motor to control said tripping circuit, and an auxiliary switch to temporarily establish said tripping circuit until the governor gets up to speed.

11. A system of the character described the combination with a motor, a pump driven by said motor, a three phase circuit for supplying current to said motor, a main line switch for all phases to control the association of said three phase circuit with said motor, a tripping circuit for said main line switch, a governor controlled by the speed of the motor to control said tripping circuit, an auxiliary switch to temporarily establish said tripping circuit until the governor gets up to speed, and an alarm circuit controlled both by said auxiliary switch and said governor.

In witness whereof, I hereunto subscribe my name this 8th day of February, A. D., 1915.

NELS JOLEEN.

Witnesses:
HAZEL A. JONES,
MAX W. ZABEL.

Copies of this patent may be obtained for five cents each, by addressing the "Commissioner of Patents, Washington, D. C."